United States Patent

Criss

[11] 4,138,128
[45] Feb. 6, 1979

[54] SKI BOARD

[76] Inventor: William H. Criss, 1130 Candlenut Dr., Naperville, Ill. 60540

[21] Appl. No.: 767,536

[22] Filed: Feb. 10, 1977

[51] Int. Cl.² .......................... A63C 5/00; B62B 13/04
[52] U.S. Cl. ..................................... 280/16; 280/12 H; 280/87.04 A; 280/600
[58] Field of Search .................. 280/16, 15, 17, 7.13, 280/87.04 A, 87.04 R, 218, 600, 11.16, 11.27, 12 H

[56] References Cited

U.S. PATENT DOCUMENTS

| 1,179,496 | 4/1916 | Bartholomew | 280/87.04 R |
|---|---|---|---|
| 1,802,116 | 4/1931 | Kinsley | 280/600 |
| 2,904,342 | 9/1959 | Jones et al. | 280/11.16 |
| 3,153,543 | 10/1964 | Magyar | 280/87.04 A |
| 3,203,706 | 8/1965 | Boyden | 280/87.04 R |
| 3,235,282 | 2/1966 | Bostick | 280/11.27 |
| 3,560,012 | 2/1971 | Auer | 280/16 |
| 3,628,804 | 12/1971 | Carreiro | 280/18 |
| 3,656,775 | 4/1972 | Krautter | 280/16 |
| 3,856,318 | 12/1974 | Hollenbach | 280/28 |
| 3,982,766 | 9/1976 | Budge | 280/11.37 S |
| 4,040,639 | 8/1977 | Scardenzan | 280/87.04 A |

FOREIGN PATENT DOCUMENTS

| 208662 | 11/1966 | Sweden | 280/15 |
|---|---|---|---|
| 38746 | 1/1907 | Switzerland | 280/16 |
| 1029590 | 5/1966 | United Kingdom | 280/87.04 A |

Primary Examiner—David M. Mitchell
Attorney, Agent, or Firm—Hosier, Niro & Daleiden, Ltd.

[57] ABSTRACT

A ski board including an elongated riding platform, a pair of mounting brackets, a pair of skis, and resilient means for joining the skis. The elongated riding platform is of a length sufficient to permit a person to stand on the platform with one foot in front of the other. The mounting brackets are attached to the underside of the elongated riding platform in longitudinally spaced relationship. The skis are attached to the mounting brackets in longitudinally aligned relationship for pivotal movement about horizontal axes. The resilient means for joining the skis connects the rear edge of the leading ski to the tip of the trailing ski. With this construction, the trailing ski will track the leading ski over uneven terrain without the possibility of bottoming out.

11 Claims, 5 Drawing Figures

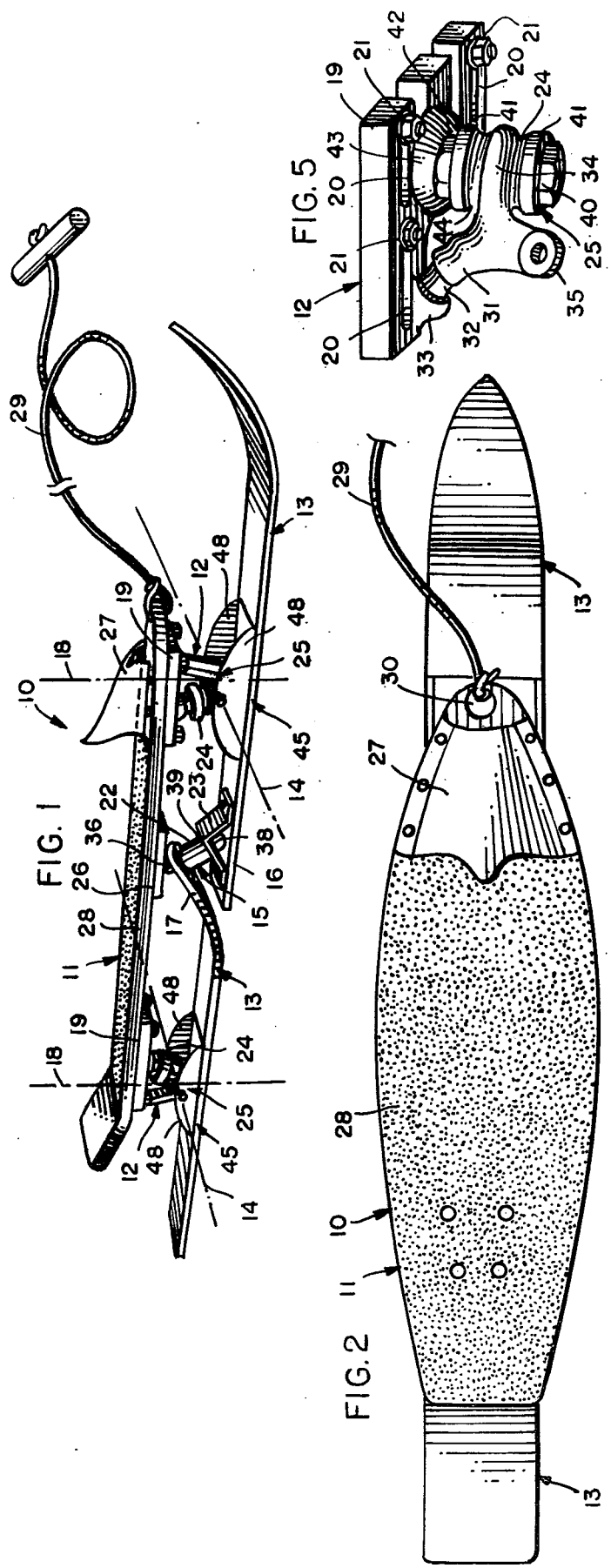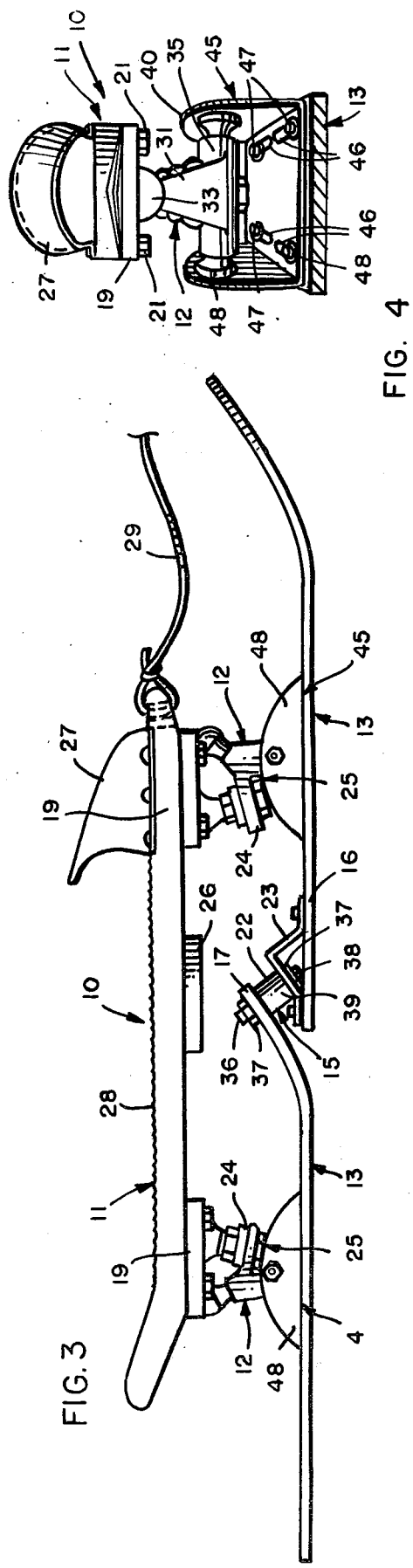

SKI BOARD

BACKGROUND

The present invention relates to a ski board and more particularly to a ski board in which a trailing ski will track a leading ski over uneven terrain.

In the art of vehicular toys, the skate board has recently been enjoying considerable commercial success primarily due to the challenging nature of the device. It is well known that it takes considerable skills of balance and coordination to successfully ride the skate board particularly down inclines and around stationary objects. The enjoyment to be obtained in mastering those skills results from the inherently difficult task of standing on a small platform supported by low friction wheels. Without these features, the skate board may well not have displaced conventional roller skates.

Since the skate board has been a success, the comparable development of a vehicular ski board toy would be expected to follow suit. It is interesting to note that many ski board designs have been proposed although none have apparently been commercially developed. The art representative of such proposals includes U.S. Pat. Nos.

3,203,706, 2,479,674, 3,297,334, 2,188,080, 1,445,219, 3,153,543, and 3,403,919. It is perhaps indicative of the failure of such proposed ski board designs that most of them do not appear to be of the same challenging nature as the skate board. While most are less challenging, the remaining proposals simply will not work.

With the vehicular ski board toys previously proposed, the rider usually has little challenge due to the rigid construction. It takes far fewer skills of balance and coordination to successfully ride a ski board of this type particularly since manueverability is severely limited. The enjoyment otherwise to be obtained in mastering such skills is impaired because of the interference of uneven terrain over which the ski board may be ridden. With these drawbacks, the failure of the vehicular ski board toys to be developed commercially is easily understandable.

While the prior art has attempted to deal with the problems associated with successfully providing a vehicular ski board toy, the present invention provides a successful ski board design representing a distinct improvement over all such prior art constructions.

SUMMARY

The present invention is directed to a ski board. The ski board includes an elongated riding platform, a pair of mounting brackets attached to the underside of the elongated riding platform in longitudinally spaced relationship, a ski attached to each of the mounting brackets in longitudinally aligned relationship, each of the skis being attached to the corresponding one of the mounting brackets for pivotal movement about a horizontal axis, and resilient means for joining the rear edge of the leading ski to the tip of the trailing ski. With these features of construction, the trailing ski will track the leading ski over uneven terrain without bottoming out.

In a preferred embodiment, the skis are attached to corresponding ones of the mounting brackets for limited pivotal movement about vertical axes. Each of the mounting brackets is attached to the underside of the elongated riding platform in longitudinally adjustable relationship having a slotted block at its upper end to receive a bolt for attachment to the underside of the platform. The skis are also attached to corresponding ones of the mounting brackets in longitudinally adjustable relationship.

The resilient means for joining the rear edge of the leading ski to the tip of the trailing ski includes a shock absorbing bolt. An angle bracket is also provided attached to the rear edge of the leading ski to receive the shock absorbing bolt passing through the tip of the trailing ski. The shock absorbing bolt tends to restore the skis to their normal positions in longitudinally aligned relationship being adjustable to vary the force exerted thereby. A shock absorbing bolt is also provided as a component of each of the mounting brackets. The shock absorbing bolts of the mounting brackets also tend to restore the skis to their normal positions in longitudinally aligned relationship also being adjustable to vary the force exerted thereby. Resilient means is thereby provided for joining the skis to the underside of the platform.

The elongated riding platform includes an impact cushion on the underside of the platform immediately above the tip of the trailing ski. It also includes an adjustable toe fitting adjacent the front edge of the platform and a roughened surface on the upper side of the platform. The elongated platform includes a removable rope connected thereto for towing the ski board of sufficient length to also permit a rider to grip the rope in a standing position on the platform for balance.

The present invention provides a ski board of a challenging nature which requires considerable skills of balance and coordination to successfully ride. It is therefore an object of the present invention to provide a ski board in which enjoyment is obtained in mastering those skills resulting from the inherently difficult task of standing on a small platform supported by maneuverable skis. It is to be understood that the provision of the ski board and the realization of the advantages to be derived therefrom constitute additional important objects of the present invention. Still other objects will be appreciated from a consideration of the details of construction and operation set forth in the accompanying specification, claims and drawings.

DRAWINGS

The invention is described in conjunction with the accompanying drawings, in which:

FIG. 1 is a perspective view of a ski board in accordance with the present invention;

FIG. 2 is a plan view of the ski board of FIG. 1;

FIG. 3 is a side elevational view of the ski board of FIG. 1;

FIG. 4 is a rear elevational view of the ski board of FIG. 1; and

FIG. 5 is a perspective view of a mounting bracket for the ski board of FIG. 1.

DESCRIPTION

In the illustration given and with reference first to FIG. 1, the numeral 10 designates generally a ski board in accordance with the present invention. The ski board 10 includes an elongated riding platform 11, a pair of mounting brackets 12 attached to the underside of the elongated riding platform 11 in longitudinally spaced relationship, a ski 13 attached to each of the mounting brackets 12 in longitudinally aligned relationship, each of the skis 13 being attached to the corresponding one of the mounting brackets 12 for pivotal movement about a horizontal axis 14, and resilient means 15 for joining the rear edge 16 of the leading ski 13 to the tip 17 of the trailing ski 13. With these features of construction, the trailing ski 13 will track the leading ski 13 over uneven terrain without bottoming out.

The skis 13 are also attached to corresponding ones of the mounting brackets 12 for limited pivotal movement about vertical axes 18. Each of the mounting brackets 12 is attached to the underside of the elongated riding platform 11 in longitudinally adjustable relationship having a block 19 at its upper end having slots 20 therein (as shown in FIG. 5) to receive bolts 21 for attachment to the underside of the platform 11. The skis 13 are also attached to corresponding ones of the mounting brackets 12 in longitudinally adjustable relationship as will be described in greater detail hereinafter.

The resilient means 15 for joining the rear edge 16 of the leading ski 13 to the tip 17 of the trailing ski 13 includes a shock absorbing bolt 22. An angle bracket 23 is also provided attached to the rear edge 16 of the leading ski 13 to receive the shock absorbing bolt 22 passing through the tip 17 of the trailing ski 13. The shock absorbing bolt 22 tends to restore the skis 13 to their normal positions in longitudinally aligned relationship being adjustable to vary the force exerted thereby. A shock absorbing bolt 24 is also provided as a component of each of the mounting brackets 12. The shock absorbing bolts 24 of the mounting brackets 12 also tend to restore the skis 13 to their normal positions in longitudinally aligned relationship also being adjustable to vary the force exerted thereby. Resilient means 25 is thereby provided for joining the skis 13 to the underside of the platform 11.

The elongated riding platform 11 includes an impact cushion 26 on the underside of the platform 11 immediately above the tip 17 of the trailing ski 13. It also includes an adjustable toe fitting 27 adjacent the front edge of the platform 11 and a roughened surface 28 on the upper side of the platform 11. The elongated platform 11 includes a removable rope 29 connected through an internal loop or aperture 30 for towing the ski board 10 of sufficient length to also permit a rider to grip the rope 29 in a standing position on the platform 11 for balance.

Referring to FIGS. 2 and 3, the elongated riding platform 11 can be better understood. It is preferably banana shaped with a slight upward flair on the rear edge although the size and shape of the platform 11 are not critical with the only criteria being that the design accommodate a rider standing upon the platform 11 with one foot in front of the other. It is preferably constructed of a rigid plastic material with the roughened surface 28 being provided by integral surface etching or the like to establish improved footing eliminating the possibility of the platform 11 becoming iced over. With the adjustable toe fitting 27 at the front end of the platform 11, a variety of foot sizes can be accommodated allowing persons of all ages and sizes to use the ski board 10 with a greater degree of stability and balance as well as leverage upon initiating a start.

The mounting brackets 12 include downwardly extending members 31 connected to the blocks 19 by means of resilient connectors 32. The resilient connectors 32 link the upper ends of the downwardly extending members 31 to sockets 33 on the bottoms of the blocks 19 in ball and socket fashion. It will be appreciated that the resilient connectors 32 permit movement of the mounting brackets 12 by reason of the resiliency of the connectors 32 and by reason of the shock absorbing bolts 24. The lower ends of the downwardly extending members 31 terminate in loops 34 encircling the shock absorbing bolts 24 and also terminate in horizontal axles 35. It will be appreciated that the loops 34 limit pivotal movement of the mounting brackets 12 about the vertical axes 18 to control the degree of manueverability of the skis 13. The horizontal axles 35 permit the skis 13 to pivot about the horizontal axes 14. With these features of construction, the mounting bracket 12 helps to give the rider controlled freedom in guidance by merely shifting body weight to direct the ski board 10.

Referring to FIGS. 3 and 5, the construction of the shock absorbing bolts 22 and 24 can be better understood. The shock absorbing bolt 22 includes a conventional bolt 36 that can be provided with washers 37 and a nut 38 with the washer 37 adjacent the nut 38 suitably being a lock washer. It will be seen that a resilient disc 39 having a central aperture therein (not shown) is provided between the tip 17 of the trailing ski 13 and the angle bracket 23 on the rear end 16 of the leading ski 13. It will be appreciated that the resilient disc 39 will tend to restore the skis to their normal positions in longitudinally aligned relationship relative to either horizontal or vertical pivotal movement. The bolt 36 passes through the central aperture in the resilient disc 39 and the nut 38 and the bolt 36 can be tightened or loosened to adjust the resiliency of the shock absorbing bolt 22. As a result, the shock absorbing bolt 22 is adjustable to vary the restoring force exerted thereby relative to pivoting of the skis 13 about both the horizontal axes 14 and the vertical axes 18.

The shock absorbing bolts 27 are constructed similarly to the shock absorbing bolt 22. They also include conventional bolts 40 that can be provided with washers 41 and nuts 42 with the washers 41 adjacent the nuts 42 suitably being lock washers. It will be appreciated that the nuts 42 can be made integral with the blocks 19 such as by welding and the blocks 19 can include downwardly extending portions 43 having internal threads into which the bolts 40 can be threaded. It will be seen that the bolts 40 pass through resilient disc 44 having central apertures therein (not shown) into the nuts 42 and internally threaded downwardly extending portions 43. The washers 41 will suitably be provided adjacent opposite ends of the resilient discs 44 to protect the discs as the nuts 41 and the bolts 40 are tightened or loosened to adjust the resiliency of the shock absorbing bolts 24. With these features, the shock absorbing bolts 24 are adjustable to vary the restoring force exerted thereby relative to pivoting the skis 13 about the vertical axes 18.

The skis are joined to the mounting brackets 12 (as shown in FIGS. 1 and 4) by means of plates 45. The plates 45 include slots 46 to receive screws 47 for attachment to the upper sides of the skis 13. It will be appreciated that each of the skis 13 is thereby attachable to the corresponding one of the mounting brackets 12 in longitudinally adjustable relationship. The plates 45 include side portions 48 having apertures therethrough to receive the horizontal axles 35 of the mounting brackets 12 being attached thereto in any conventional fashion such as by lock nuts. It will be seen that the plates 45 thereby attach the skis 13 to the mounting brackets 12 for pivotal movement about the horizontal axes 14. The plates 45 and the mounting brackets 12 having these adjustability features make it possible to widely vary the location of the elongated riding platform 11 relative to the skis 13. With these features of construction, the rider can shift his center of gravity relative to the components of the ski board 10 depending upon his size, weight, and stance, thereby positively influencing the successfulness of his manuevering.

When the mounting brackets 12, the plates 45, the shock absorbing bolt 22, and the shock absorbing bolts 24 have all been adjusted and secured to the satisfaction of the rider, it is not necessary to adjust the ski board 10 again until a change in manuevering characteristics is desired. The shock absorbing bolt 22 will tend to restore the skis 13 to their normal position in longitudinally aligned relationship as they pivot about the horizontal axes 14 and the vertical axes 18. The shock absorbing bolts 22 and 24 make it possible to achieve four way manueverability, i.e., clockwise and counter-clockwise about the horizontal axes 14 and clockwise and counter-clockwise about the vertical axes 18, limited only by the restoring forces and actions of the rider. The shock absorbing bolts 24 also will tend to restore the skis to their normal positions in longitudinally aligned relationship as they pivot about their vertical axes 18. With these features of construction, the rider has complete freedom in guidance by merely shifting body weight as well as complete control in use due to the trailing ski 13 tracking the leading ski 13 over uneven terrain without bottoming out.

The present invention is therefore directed to a ski board in which a trailing ski will track a leading ski over uneven terrain without bottoming out. It accomplishes this objective while providing enhanced manuevering characteristics heretofore not available resulting from the challenging nature of its design. The ski board utilizes the unique concept of joining the rear edge of a leading ski to the tip of a trailing ski by resilient means tending to restore the skis to a normal position and can be used to ride down inclines and around stationary objects. It provides enjoyment obtained by mastering skills of balance and coordination resulting from the difficult task of standing on a small platform supported by manueverable skis. While accomplishing these objectives, the ski board of the present invention can be constructed of durable materials to withstand the rough treatment and conditions under which it will normally be used.

While in the foregoing specification a detailed description of the invention has been set forth for purposes of illustration, variations of the details herein given may be made by those skilled in the art without departing from the spirit and scope of the invention as set forth in the appended claims.

I claim:

1. A ski board comprising an elongated riding platform, a pair of mounting brackets attached to the underside of said riding platform in longitudinally spaced relationship, each of said mounting brackets including means permitting pivotal movement of said mounting bracket about a horizontal and a vertical axis relative to said riding platform, a ski having a curved tip and a planar rear edge attached to each of said mounting brackets in a normal longitudinally aligned position to define a leading ski and a trailing ski wherein said tip of said trailing ski slightly overlaps said rear edge of said leading ski, each of said skis including means permitting pivotal movement of said ski about a horizontal axis relative to said mounting bracket, and means for joining said rear edge of said leading ski to said tip of said trailing ski including a resilient disc and a ski-joining bolt extending therethrough, said joining means limiting pivotal movement of said skis about said horizontal and vertical axes by exerting a force tending to restore said skis to said normal longitudinally aligned position whereby said trailing ski will track said leading ski over uneven terrain.

2. The ski board of claim 1 in which each of said mounting brackets includes means for adjusting the longitudinal position of said mounting bracket relative to the underside of said riding platform.

3. The ski board of claim 2 in which said longitudinal adjustment means of each of said mounting brackets includes a slotted block at the upper end of said mounting bracket to receive bolts for attachment to the underside of said riding platform.

4. The ski board of claim 1 in which each of said skis includes means for adjusting the longitudinal position of said ski relative to the corresponding one of said mounting brackets.

5. The ski board of claim 4 in which said longitudinal adjustment means of each of said skis includes a plate cooperatively associated with the corresponding one of said mounting brackets having slots to receive screws for attachment to the upper side of said ski.

6. The ski board of claim 1 in which said means for joining said rear edge of said leading ski to said tip of said trailing ski includes an angle bracket attached to said rear edge of said leading ski and said ski-joining bolt joins said tip of said trailing ski to said angle bracket.

7. The ski board of claim 6 in which said ski-joining bolt passes through said tip of said trailing ski, a resilient disc and said angle bracket; said ski-joining bolt cooperating with a nut to secure said trailing ski, resilient disc, and angle bracket in assembled relationship; said nut being adjustable to vary the force tending to restore said skis to said normal longitudinally aligned position.

8. The ski board of claim 1 in which said riding platform includes a toe fitting adjacent the front edge of said platform.

9. The ski board of claim 1 in which said riding platform includes a roughened surface on the upper side of said platform.

10. The ski board of claim 1 in which said riding platform includes an impact cushion on the underside of said platform immediately above said tip of said trailing ski.

11. The ski board of claim 1 in which said riding platform includes a removable rope connected thereto for towing said ski board having a length sufficient to also permit a rider to grip said rope in a standing position on said platform for balance.

* * * * *